United States Patent
Kim et al.

(12)

(10) Patent No.: US 11,382,005 B2
(45) Date of Patent: Jul. 5, 2022

(54) METHOD FOR MANAGING SESSION AND SMF NODE

(71) Applicant: LG ELECTRONICS INC., Seoul (KR)

(72) Inventors: Hyunsook Kim, Seoul (KR); Jinsook Ryu, Seoul (KR); Sangmin Park, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 16/986,966

(22) Filed: Aug. 6, 2020

(65) Prior Publication Data

US 2020/0367115 A1    Nov. 19, 2020

Related U.S. Application Data

(63) Continuation of application No. 16/065,083, filed as application No. PCT/KR2017/014045 on Dec. 4, 2017, now Pat. No. 10,798,618.

(Continued)

(51) Int. Cl.
*H04W 76/10* (2018.01)
*H04W 36/00* (2009.01)
(Continued)

(52) U.S. Cl.
CPC ......... *H04W 36/0033* (2013.01); *H04L 45/00* (2013.01); *H04W 8/02* (2013.01);
(Continued)

(58) Field of Classification Search
CPC . H04W 36/0033; H04W 88/14; H04W 60/04; H04W 8/20; H04W 92/20;
(Continued)

(56) References Cited

U.S. PATENT DOCUMENTS

2012/0020243 A1  1/2012 Gong
2012/0116560 A1  5/2012 Francois et al.
(Continued)

FOREIGN PATENT DOCUMENTS

CN  105247920  1/2016
CN  107371215  11/2017
(Continued)

OTHER PUBLICATIONS

Japan Patent Office Application No. 2019-517826, Office Action dated Aug. 18, 2020, 3 pages.
(Continued)

*Primary Examiner* — John D Blanton
(74) *Attorney, Agent, or Firm* — Lee Hong Degerman Kang Waimey

(57) ABSTRACT

The one disclosure of the present specification proposes a method for managing session. The method may be performed by a session management function, SMF, node and comprise: generating a packet data unit, PDU, session for a user equipment, UE; receiving, from an access and mobility management function, AMF, node, information about the UE; and determining, based on the information, whether to transmit an indication for notifying a user plane function, UPF, node to discard a downlink data for the PDU session of the UE. The determination may be dependent on whether the PDU session corresponds to a first service provided to the UE.

10 Claims, 14 Drawing Sheets

Related U.S. Application Data

(60) Provisional application No. 62/538,787, filed on Jul. 30, 2017, provisional application No. 62/474,055, filed on Mar. 20, 2017.

(51) Int. Cl.
| | | |
|---|---|---|
| *H04W 36/32* | (2009.01) | |
| *H04W 88/14* | (2009.01) | |
| *H04W 80/10* | (2009.01) | |
| *H04W 76/00* | (2018.01) | |
| *H04L 45/00* | (2022.01) | |
| *H04W 8/02* | (2009.01) | |

(52) U.S. Cl.
CPC .......... *H04W 36/32* (2013.01); *H04W 76/00* (2013.01); *H04W 80/10* (2013.01); *H04W 88/14* (2013.01)

(58) Field of Classification Search
CPC ....... H04W 8/02; H04W 36/32; H04W 76/00; H04W 80/10; H04W 76/22; H04W 28/06; H04L 45/00
See application file for complete search history.

(56) References Cited

U.S. PATENT DOCUMENTS

| 2013/0003697 | A1* | 1/2013 | Adjakple | ................ H04L 45/74 370/331 |
|---|---|---|---|---|
| 2017/0332421 | A1 | 11/2017 | Sternberg et al. | |
| 2018/0199398 | A1* | 7/2018 | Dao | ..................... H04L 41/5019 |
| 2018/0270877 | A1* | 9/2018 | Lee | ........................ H04W 48/16 |
| 2019/0028923 | A1* | 1/2019 | Futaki | .................... H04W 24/02 |
| 2019/0166647 | A1* | 5/2019 | Velev | ..................... H04W 80/10 |
| 2019/0200264 | A1 | 6/2019 | Kim et al. | |

FOREIGN PATENT DOCUMENTS

| RU | 2294602 | 2/2007 |
|---|---|---|
| WO | 2015026111 | 2/2015 |
| WO | 2016208950 | 12/2016 |
| WO | 2017026760 | 2/2017 |
| WO | 2018169341 | 9/2018 |

OTHER PUBLICATIONS

European patent application No. 17812298.2, European search report dated Oct. 7, 2020, 9 pages.
Huawei et al., "Handling of PDU session when UE moves out of LADN service area," SA WG2 Meeting #121, S2-173306, Hangzhou, China, May 15-19, 2017, 3 pages.
Samsung, "TS 23.502—Update 4.2.2.2 Generation Registration," SA WG2 Meeting #S2-121, S2-173269, Hangzhou, China, May 15-19, 2017, 6 pages.
Qualcomm et al., "TS 23.502: PDU sessions handling for LADNs," SA WG2 Meeting #121, S2-173111, Hangzhou, P. R. China, May 15-19, 2017, 33 pages.
3GPP TS 23.501 V0.1.0 (Jan. 2017), 3GPP; Technical Specification Group Services and System Aspects; System Architecture for the 5G System; Stage 2 (Release 15), 65 pages.
The State Intellectual Property Office of the People's Republic of China Application Serial No. 201780018574.3, Office Action dated Mar. 31, 2021, 6 pages.
IP Australia Application No. 2017405271, Office Action dated Mar. 27, 2020, 4 pages.
Intellectual Property Office of India Application Serial No. 201917025724, Office Action dated Nov. 6, 2020, 7 pages.
Japan Patent Office Application No. 2019-517826, Office Action dated Apr. 7, 2020, 3 pages.
Qualcomm Incorporated et al., "TS 23.501: PDU sessions handling for LADNs", S2-173983, SA WG2 Meeting #121, May 2017, 5 pages.
Catt et al., "TS 23.502: PDU session handling in HO procedure", S2-173650, 3GPP TSG SA WG2 Meeting #121, May 2017, 3 pages.
Samsung, "TS 23.501: Buffering of downlink data", S2-171025, SA WG2 Meeting #119, Feb. 2017, 2 pages.
PCT International Application No. PCT/KR2017/014045, Written Opinion of the International Searching Authority dated Mar. 7, 2018, 3 pages.
Qualcomm Incorporated, "23.501—Additional concepts and corrections for support for connectivity to a local area network," SA WG2 Meeting #S2-119, S2-170757, Feb. 2017, 6 pages.
Catt, "TS 23.502: SMF relocation during a registration update procedure," SA WG2 Meeting #119, S2-171057, Feb. 2017, 7 pages.
Catt, "SMF and UPF interactions," SA WG2 Meeting #S2-119, S2-171155, Feb. 2017, 4 pages.
LG Electronics, "TS 23.502: Update of Session Establishment Procedure for Home Routed roaming—including subscription info access in vSMF," SA WG2 Meeting #119, S2-171520, Feb. 2017, 5 pages.
Russian Federation Federal Service for Intellectual Property, Patents and Trademarks Application Serial No. 2019120827/07, Notice of Allowance dated Jun. 8, 2020, 10 pages.
U.S. Appl. No. 16/065,083, Office Action dated Jan. 16, 2020, 10 pages.
U.S. Appl. No. 16/065,083, Office Action dated May 22, 2019, 9 pages.
Korean Intellectual Property Office Application No. 10-2019-7002614, Office Action dated Jul. 1, 2019, 4 pages.
3rd Generation Partnership Project; Technical Specification Group Services and System Aspects; Procedures for the 5G System; Stage 2 (Release 15), 3GPP TS 23.502 V0.2.0, Feb. 2017, 71 pages.
Ericsson, et al., "Service Request procedure updates", S2-171375, SA WG2 Meeting #119, Feb. 2017, 8 pages.

\* cited by examiner

METHOD FOR MANAGING SESSION AND SMF NODE

CROSS-REFERENCE TO RELATED APPLICATIONS

This application is a continuation of U.S. patent application Ser. No. 16/065,083, filed on Jun. 21, 2018, which is the National Stage filing under 35 U.S.C. 371 of International Application No. PCT/KR2017/014045, filed on Dec. 4, 2017, which claims the benefit of U.S. Provisional Application No. 62/474,055, filed on Mar. 20, 2017, and 62/538,787, filed on Jul. 30, 2017, the contents of which are all hereby incorporated by reference herein in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

On the other hand, in a situation where the UE roams on a visited network, for example, a V-PLMN, there are two schemes for processing a signaling request from the UE. In the first scheme, that is, LBO (local break out) scheme, the visited network handles the signaling request from the UE. According to the second scheme, that is, Home Routing (HR) scheme, the visited network transmits a signaling request from the UE to the home network of the UE.

FIG. 3A is an exemplary diagram illustrating an architecture to which a local breakout (LBO) scheme is applied when the UE is roaming; FIG. 3B is an exemplary diagram illustrating an architecture to which an HR (home routed) scheme is applied when the UE is roaming.

As shown in FIG. 3A, in the architecture to which the LBO scheme is applied, a PCF node in the VPLMN performs an interaction with an AF node to generate a PCC rule for a service in the VPLMN. The PCF node in the VPLMN creates the PCC rule based on the policy set therein according to the roaming agreement with the HPLMN provider.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 3A is an exemplary diagram illustrating an example of an architecture for implementing the concept of network slicing.

As can be seen from FIG. 3A, the core network (CN) may be divided into several slice instances. Each slice instance may contain one or more of a CP function node and a UP function node.

Each UE may use a network slice instance corresponding to its service through RAN.

Unlike the case shown in FIG. 3A, each slice instance may share one or more of a CP function node, and a UP function node with another slice instance. This will be described with reference to FIG. 4 below.

FIG. 3B is an exemplary view showing another example of an architecture for implementing the concept of network slicing.

Referring to FIG. 3B, a plurality of UP function nodes are clustered, and a plurality of CP function nodes are also clustered.

Further, referring to FIG. 3B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Interworking with Legacy 4th Generation Mobile Communication System>

Even if the UE leaves the coverage of the next generation RAN (Radio Access Network), the UE must be able to receive service via a 4G mobile communication system. This is called interworking. Hereinafter, interworking will be described in detail.

FIG. 4A shows an architecture for interworking when the UE is not roaming, and FIG. 4B shows an architecture for interworking when the UE is roaming.

Referring to FIG. 4A, when the UE does not roam, E-UTRAN and EPC for legacy 4th generation LTE, and 5th generation mobile communication network may be interworked with each other. In FIG. 4A, a packet data network gateway (PGW) for a legacy EPC is divided into a PGW-U, which is responsible for only the user plane, and a PGW-C, which is responsible for the control plane. Moreover, the PGW-U is merged into the UPF node of the fifth-generation core network, and the PGW-C is merged into the SMF node of the fifth-generation core network. Moreover, the Policy and Charging Rules Function (PCRF) for the legacy EPC may be merged into the PCF of the 5th generation core network. Moreover, the HSS for the legacy EPC may be merged into the UDM of the 5th generation core network. The UE may access the core network through the E-UTRAN. Alternatively, the UE may access the core network through the 5G radio access network (RAN) and the AMF.

Referring to FIGS. 4A and 4B while comparing FIGS. 4A and 4B, when the UE roams on a Visited Public Land Mobile Network (VPLMN), the data of the UE is delivered via the Home PLMN (HPLMN).

Meanwhile, the N26 interface shown in FIGS. 4A and 4B refers to an interface connected between the MME and the AMF node to facilitate interworking between the EPC and the NG core. This N26 interface may be selectively supported depending on the network operator. That is, for interworking with the EPC, the network operator may provide the N26 interface or may not provide the N26 interface.

<LADN (Local Area Data Network)>

On the other hand, in the next generation (i.e., fifth generation) mobile communication, it is considered to provide a local area service (or a specialized service for each geographical area). This local service is considered to be called as LADN in the next generation mobile communication.

FIG. 6 shows an example of a LADN service.

Referring to FIG. 6, when the UE is located in a predetermined service area, the UE may receive the LADN service. To this end, when the UE enters the predetermined service area, the UE may generate a PDU (Packet Data Unit) session for the LADN.

However, no concrete method for managing the PDU session for the LADN has been presented so far.

SUMMARY OF THE INVENTION

Therefore, the present disclosure aims at suggesting a scheme for efficient management of PDU sessions in the LADN.

To achieve the foregoing purposes, the disclosure of the present specification proposes a method for managing session. The method may be performed by a session management function, SMF, node and comprise: generating a packet data unit, PDU, session for a user equipment, UE; receiving, from an access and mobility management function, AMF, node, information about the UE; and determining, based on the information, whether to transmit an indication for notifying a user plane function, UPF, node to discard a downlink data for the PDU session of the UE. The determination may be dependent on whether the PDU session corresponds to a first service provided to the UE.

If the PDU session corresponds to the first service, the indication for notifying the UPF node to discard the downlink data may be transmitted based on the information.

If the PDU session corresponds to the first service and on the basis of the information, the method may further comprise deactivating but not releasing the PDU session of the UE, such that a context for the PDU session is maintained.

If the UPF nodes receives the indication, the UPF may stop buffering the downlink data for the PDU session of the UE.

The method may further comprise: receiving a service request for transmitting a data; and transmitting a reject message in consideration of the information, if the PDU session corresponds to the first service.

To achieve the foregoing purposes, the disclosure of the present specification also proposes a session management function, SMF node for managing a session. The SMF node may comprise: a transceiver configured to receive, from an access and mobility management function, AMF, node, information about a user equipment, UE; and a processor configured to: generate a packet data unit, PDU, session for the UE; and determine, based in the information, whether to transmit an indication for notifying a user plane function, UPF, node to discard a downlink data for the PDU session of the UE. The determination may be dependent on whether the PDU session corresponds to a first service provided to the UE.

According to the disclosure of the present invention, the problem of the conventional technology described above may be solved.

DETAILED DESCRIPTION OF THE INVENTION

Figure 1:
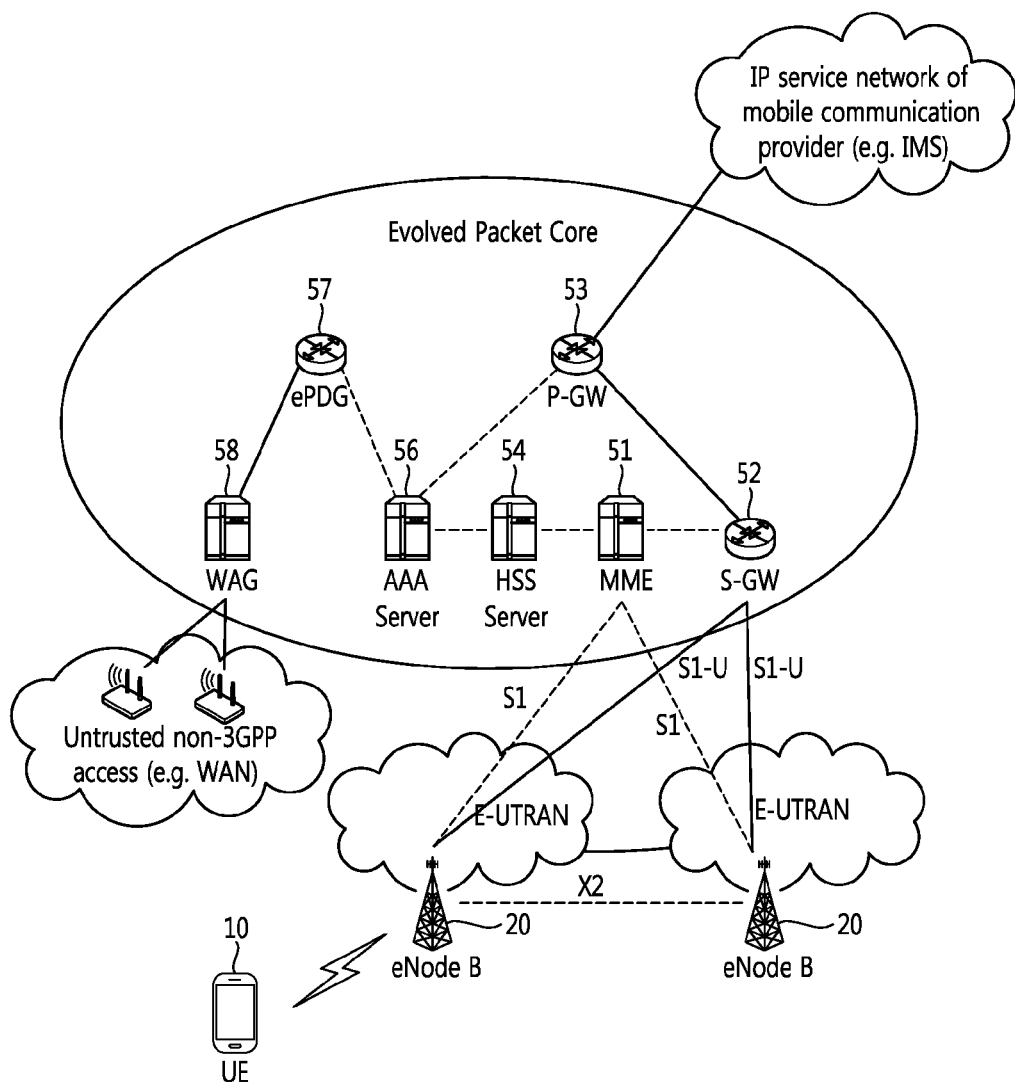
FIG. 1 shows the configuration of an evolved mobile communication network.
Figure 2:
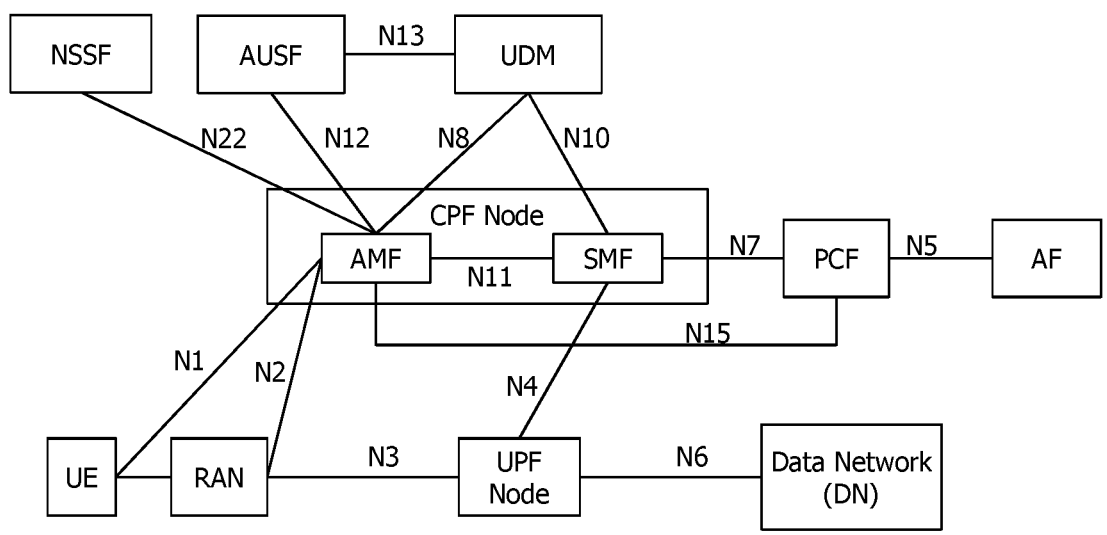
FIG. 2 is an exemplary diagram illustrating a predicted structure of a next generation mobile communication in terms of a node.
Figure 3A:
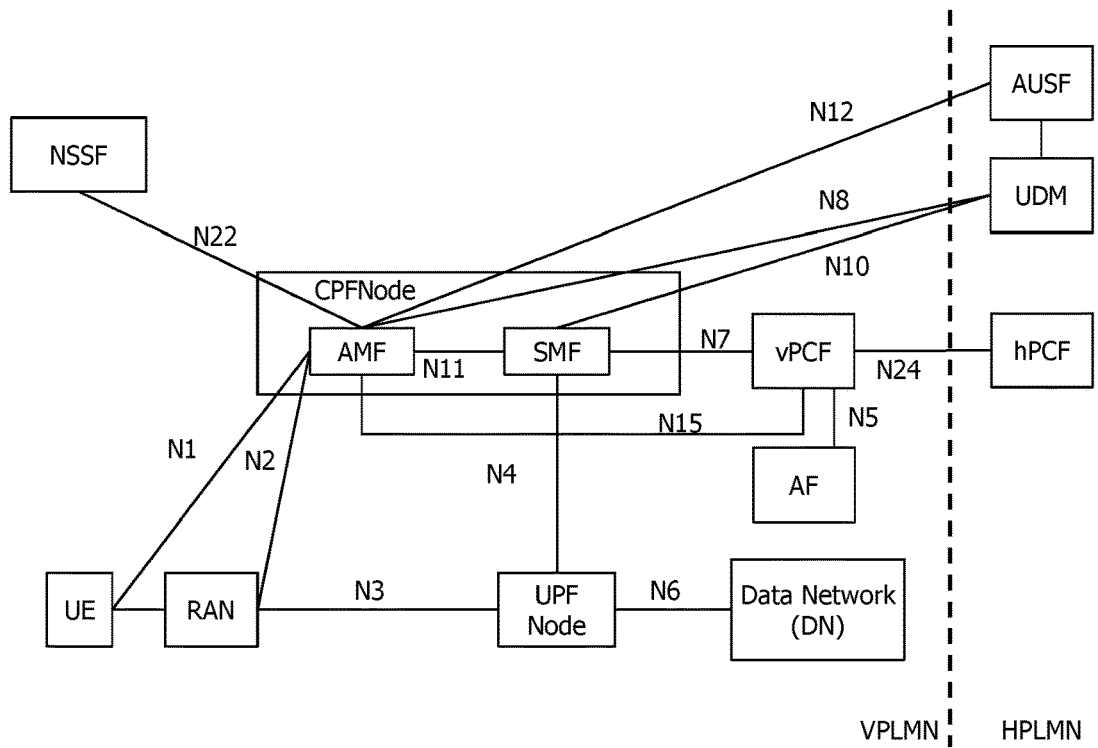
FIG. 3A is an exemplary diagram illustrating an architecture to which a local breakout (LBO) scheme is applied when roaming.
Figure 3B:
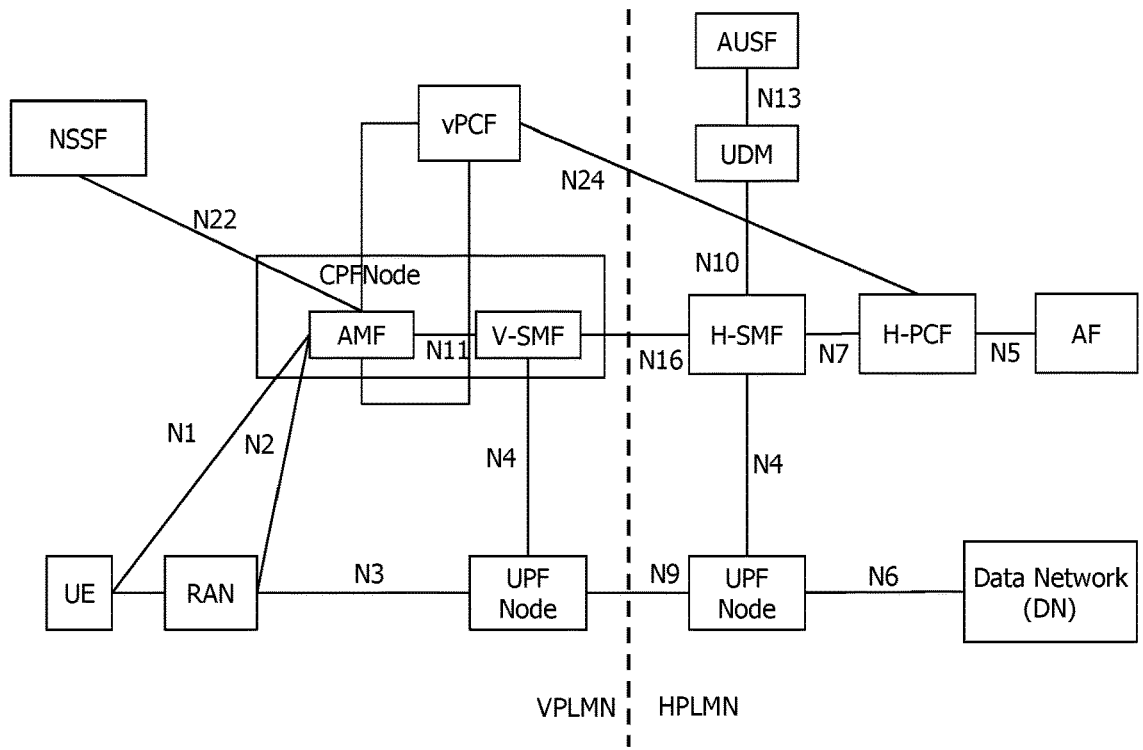
FIG. 3B is an exemplary diagram illustrating an architecture to which an HR (home routed) scheme is applied when roaming.
Figure 4A:
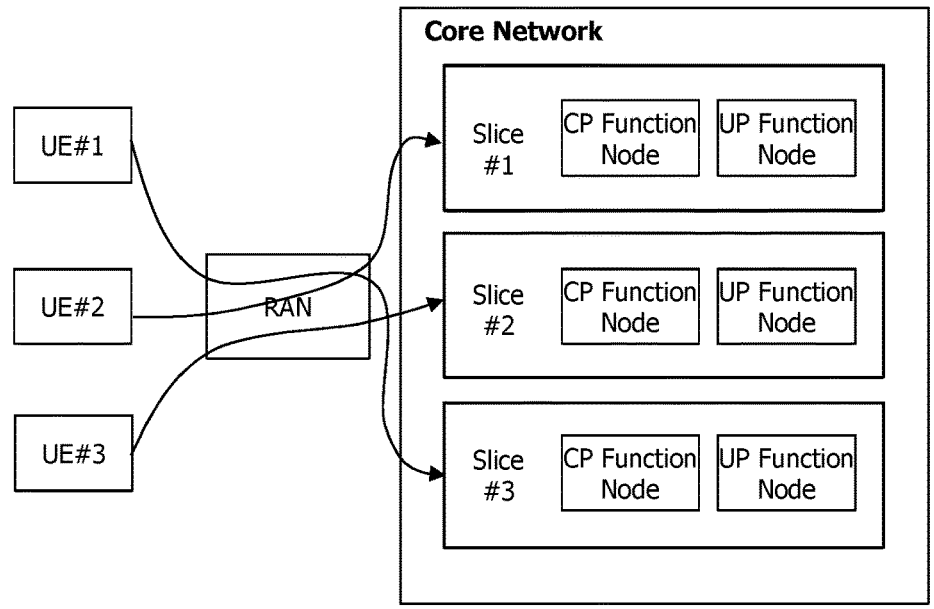
FIG. 4A is an exemplary view illustrating an example of an architecture for implementing the concept of network slicing.
Figure 4B:
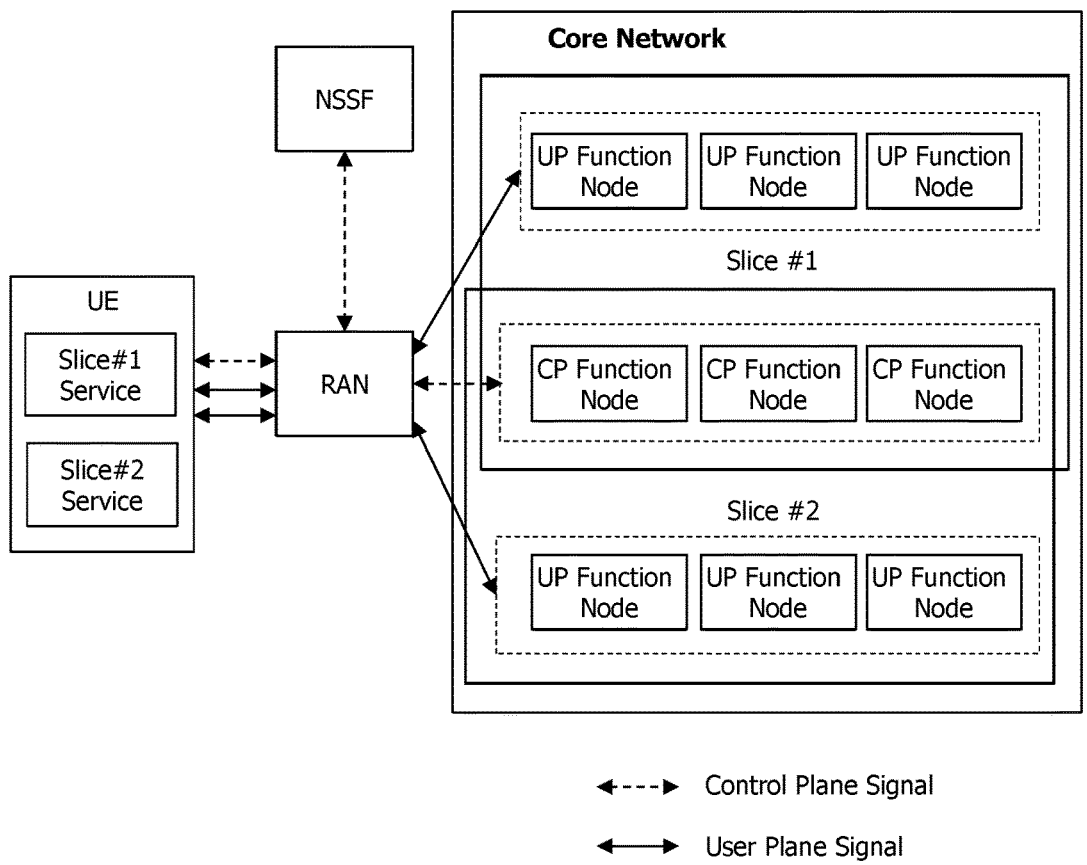
FIG. 4B is an exemplary diagram illustrating another example of an architecture for implementing the concept of network slicing.
Figure 5A:
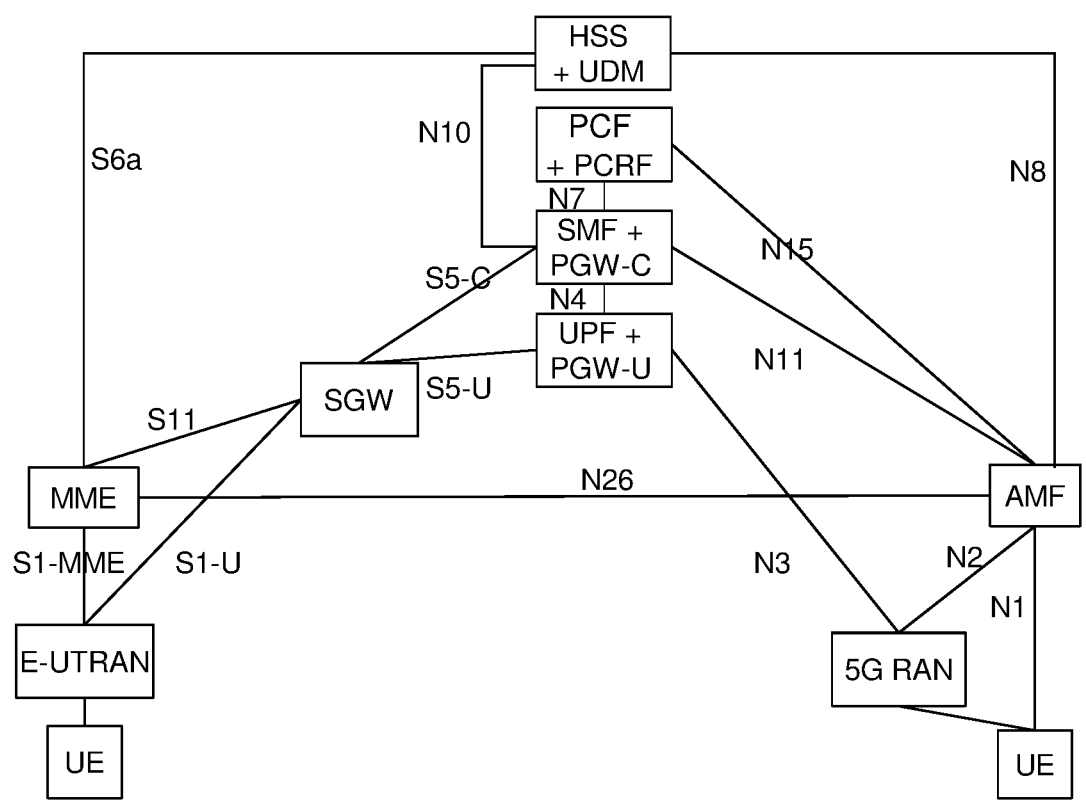
FIG. 5A shows an architecture for interworking when a UE does not roam.
Figure 5B:
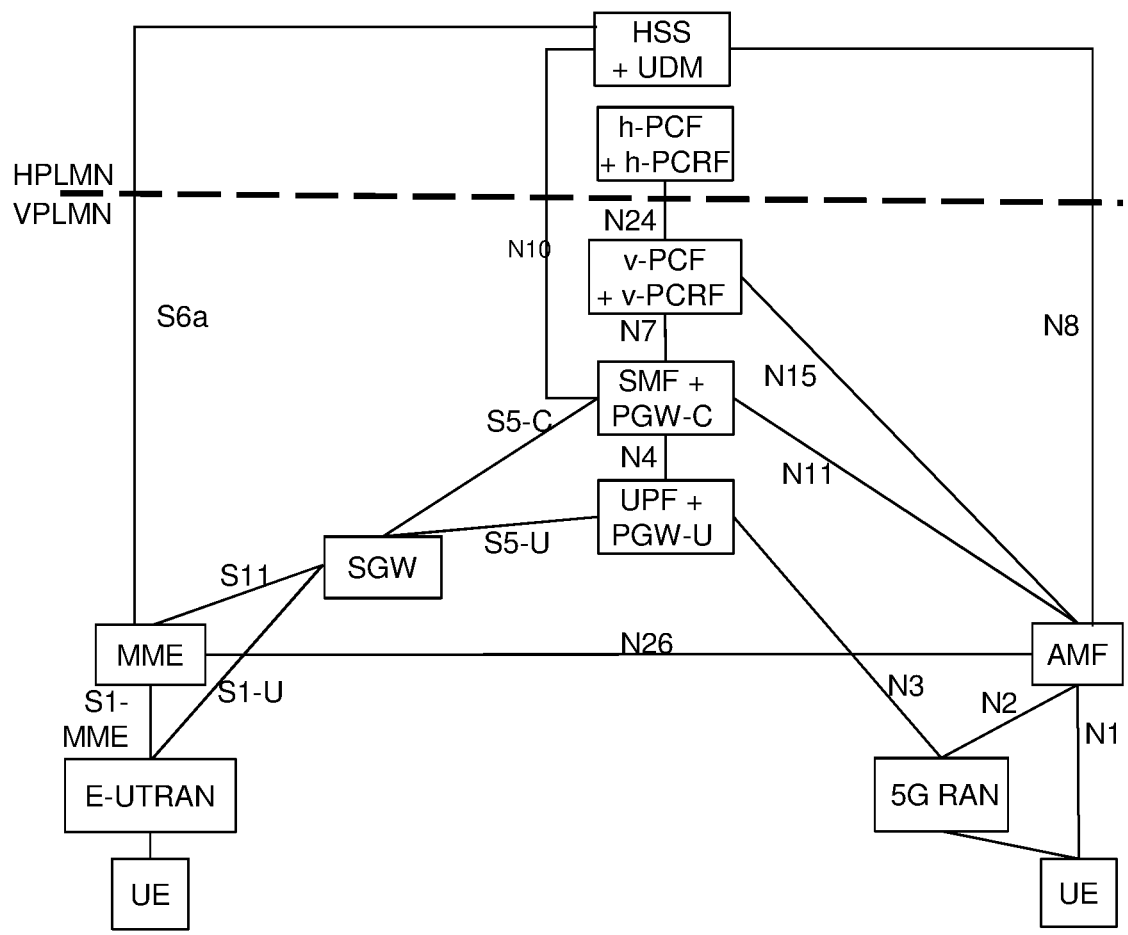
FIG. 5B shows an architecture for interworking when a UE is roaming.
Figure 6:
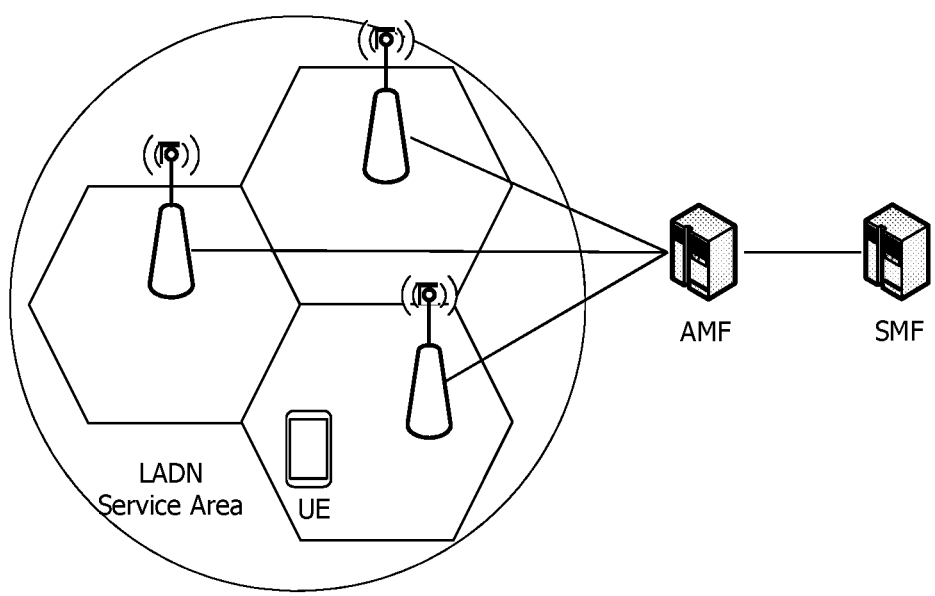
FIG. 6 shows an example of a LADN service.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A PDN connection refers to a connection from UE to a PDN, that is, an association (or connection) between UE represented by an IP address and a PDN represented by an APN.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

<LADN (Local Area Data Network)>

In the next generation (i.e., fifth generation) mobile communication, it is considered to provide a local area service (or a specialized service for each geographical area). This local service is considered to be called as LADN in the next generation mobile communication.

Figure 7:
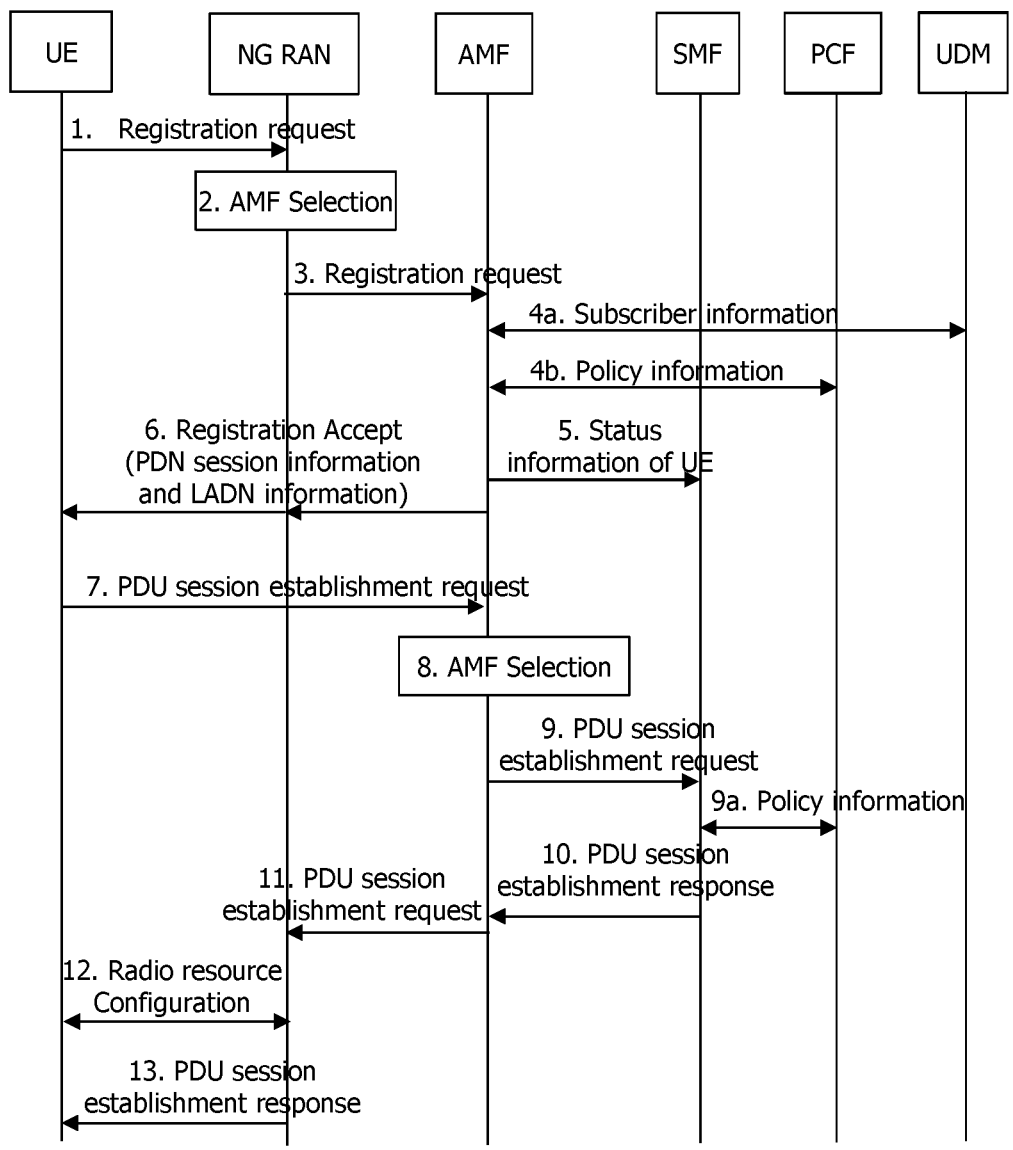
FIG. 7 shows a registration procedure and a PDU session establishment procedure.

FIG. 7 shows a registration procedure and a PDU session establishment procedure.

1) Referring to FIG. 7, the UE transmits a registration request message to the base station of the NG RAN. If there is a previously established PDU session by the UE, the UE may include information on the previously established PDU session in the registration request message.

2) Then, the base station of the NG RAN selects an AMF node.

3) Moreover, the base station of the NG RAN transmits the registration request message to the selected AMF node.

4) The AMF node obtains the subscriber information of the UE from the UDM. In addition, the AMF node obtains policy information from the PCF.

5) Moreover, the AMF node transmits to the SMF node the status information of the UE (i.e., information indicating that the UE is now able to receive a signal).

6) The AMF node transmits a Registration Accept message to the UE. At this time, if there is a previously established PDU session, the registration accept message may include information about the PDN session. Further, if the UE is subscribed to the LADN service, the AMF node may include the LADN information into the registration accept message. The LADN information may include LADN identification information and information about LADN service valid within a pre-registered geographical area. Further, the LADN information may include information on the pre-registered geographical area.

7) Meanwhile, if there is no PDU session previously established by the UE, the UE transmits a PDU session establishment request message to the AMF node through the NG RAN.

8) The AMF node selects an SMF node for the UE.

9) Moreover, the AMF node transmits a PDU session establishment request to the SMF node.

9a) The AMF node obtains policy information about session establishment from the PCF node.

10 to 12) Upon receiving a PDU session establishment response message from the SMF node, the AMF node transmits a PDU session establishment request to the base station of the NG RAN. Thus, the base station of the NG RAN establishes radio resources.

13) The base station of the NG RAN transmits the PDU session establishment response message to the UE.

Meanwhile, although not shown, if there is a PDU session previously established by the UE, the UE may transmit a service request message instead of the PDU session establishment request message in the step 7 above.

<Problems that May be Considered for LADN Service>

Figure 8:
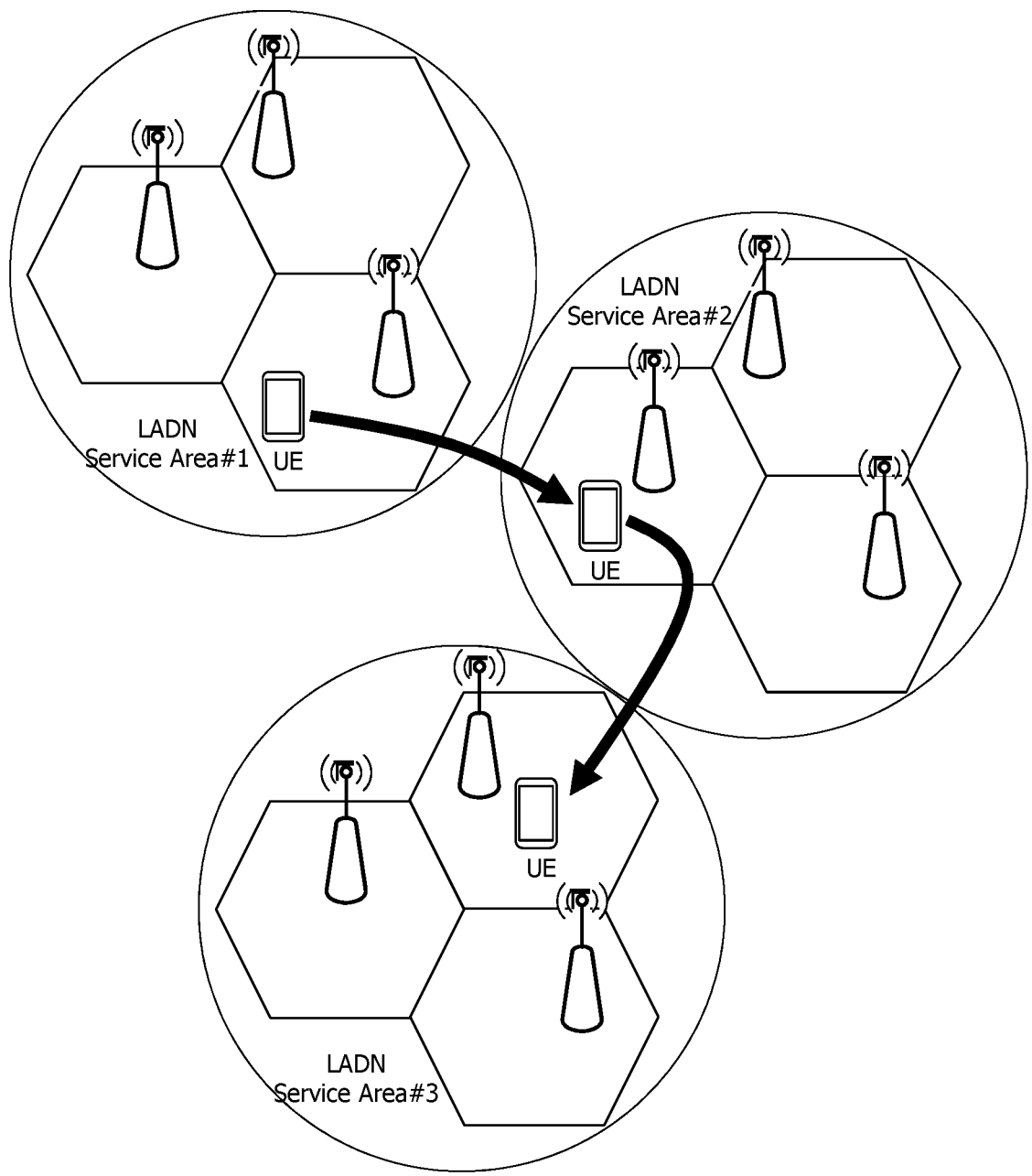
FIG. 8 shows an example in which the UE moves in the LADN service area.

FIG. 8 shows an example in which the UE moves in the LADN service area.

Referring to FIG. 8, the UE may move from the LADN service area #1 to the LADN service area #2 to the LADN service area #3.

If the above movement is performed when the UE is idle, a location update procedure (e.g., a tracking area update (TAU) procedure) may be performed. In this connection, the 5G core network may transmit information (i.e., LADN information) about the data network available to the UE along with the TAU list.

However, since the UE simply passes through the LADN service area #2, it may be inefficient to send LADN information to the UE in the LADN service area #2. In other words, the transmission of LADN information in the intermediate transit region causes a waste of network signaling/resources. Further, the UE may have a burden to receive and process unnecessary information.

On the other hand, when a PDU session created in the authorized area is required to be used according to the policy/subscription information of the service provider (for example, when the user is subscribed to receive the advertisement in the specific area), the session must also be created and managed by the network. However, in general, the session has to be created only by the UE.

Further, when the PDU session for the LADN service is generated in the specific area (or a predetermined area) that is permitted, and, then, the PDU session is out of the specific area, thus, the PDU session is released. However, if the UE repeatedly moves to between the authorized specific area and an unauthorized area, there is a problem that signaling for generating/releasing the session is unnecessarily wasted.

<The Disclosure of the Present Specification>

Therefore, the disclosure of the present specification aims to propose a scheme for efficient management of the PDU session in the LADN in order to solve the above-mentioned problem.

The inventions presented in the present specification may be implemented in one or more combinations of the following proposals.

Hereinafter, it is assumed that information on the available DNN (Data Network Name) and the permitted geographical area are included in the LADN information/policy information.

I. The first disclosure is directed to a scheme that informs the network of information indicating whether the UE uses the LADN or a preference for the LADN.

The UE may include indications indicating whether the UE uses the LADN or a preference for the LADN into a registration request message (including a registration request message at the time of attaching, a location update request message or a periodic location update request message according to the movement) in a predetermined specific area, and may transmit the message to the network. The network node may determine whether to transmit LADN information to the UE based on the indications received from the UE. In making the determination, the network node may consider or ignore the indications received from the UE according to the subscriber information or service provider policy for the UE.

A concrete application example of the above scheme will be described as follows.

Suppose that a service provider has established the LADN in a specific area where the stadium or theater is located. The UE may receive information related to a game or performance through a specific application for the LADN. While the UE using the specific application may transmit a registration request message in the corresponding area, the UE may include the indication indicating whether the service is used by the UE or the preference thereof for the LADN service. If the indication included in the registration request message indicates that the UE desires to receive the LADN service, the network node transmits LADN information by including the LADN information in the registration accept message.

On the other hand, if the UE has executed the specific application and the UE has not previously obtained the corresponding LADN information, the UE transmits the registration request message including the indication to obtain the LADN information.

II. The second disclosure relates to a scheme in which the network forces the UE to generate a PDU session for the LADN.

When the UE performs location registration according to the specific policy of the service provider, or when the UE with specific subscriber information performs location registration, the network sends to the UE an indication to force generation of the PDU session for the LADN. If the UE transmits a location registration message (e.g., a TAU request message) in an authorized area, the network node transmits a location registration response message (for example, TAU accept message) including an indication that the PDU session must be generated, and LADN information. Then, the UE performs PDU session establishment for the LADN based on the indication. On the other hand, the network node may transmit the indication and then drive a corresponding timer. In addition, the network node may check whether the PDU session establishment request message is received from the UE until the timer expires. If the PDU establishment request message is not received from the UE until the timer expires, the network node may perform control such as blocking specific or all services of the UE or applying a billing policy (for example, withdrawing a discount rate) according to a service provider policy. Meanwhile, when the generation of the PDU session is completed, the network node may transmit information on completion of the PDU session creation to the application server.

In another scheme, when the application server detects a location movement of the UE, and then the UE enters the authorized area (i.e., specific area), the application server sends an indication that the PDU session must be generated, to the UE. For example, the indication may be included in the paging signal which is sent to the UE.

A concrete application example of the above scheme will be described as follows.

If the UE is subscribed to the network under the condition that the UE receives the advertisement in the specific area designated by the service provider, and when the UE enters the specific area, the network node sends an indication to the UE to force generation of the PDU session for the LADN.

III. The third disclosure: relates to exchanging/updating LADN information when the UE moves repeatedly between authorized and unauthorized areas.

Suppose that a UE using a PDU session for LADN moves frequently within a short time between an authorized area and an unauthorized area. In such a situation, it may be inefficient for the UE to repeatedly receive LADN information from the network. In order to solve this problem, according to the third disclosure of the present specification, as a modification of the first disclosure, an indication indicating that the UE does not need to receive LADN information, or an indication that the UE does not need to additionally receive LADN information because the UE already has the LADN information may be transmitted by the UE to the network node.

In addition, the third disclosure proposes a scheme for managing LADN-related information/policies on a version basis. That is, since the LADN information may be changed even in a short time, the network node delivers the LADN information and corresponding version information (or information such as a time stamp) to the UE. If the UE repeatedly enters the same authorized area within a predetermined time, the UE may include the version information in a location registration/update request message and transmit the message to the network node. Then, the network node may determine whether to transmit new LADN information to the UE based on the match/mismatch between version information on the latest LADN information and the version information obtained from the UE.

Meanwhile, the above description may be applied not only when the UE repeatedly enters the corresponding area, but also when the UE performs a periodic location registration/update request procedure. For example, whenever the UE performs a periodic location registration/update request procedure, it may be inefficient for the UE to receive the same LADN information from the network node. Thus, when the UE performs a periodic location registration/update request procedure within the same authorized area, the UE may transmit the version information to the network node. Then, the network node may determine whether to transmit new LADN information to the UE based on the matching/mismatching between version information on the latest LADN information and the version information obtained from the UE.

IV. The fourth disclosure relates to the PDU session control/management of the network when the UE moves repeatedly between an authorized area and an unauthorized area.

Since the PDU session for the LADN may only be used within the authorized area, if the UE enters the unauthorized area out of the authorized area, it may common that the PDU session for the LADN may be released. However, in a situation where a UE using a PDU session for LADN moves frequently within a short time between the authorized area and the unauthorized area, PDU session release and establishment may be repeated. Therefore, in such a situation, releasing and re-establishing the LADN session may be inefficient.

Accordingly, according to the fourth disclosure of the present specification, when the network detects a location movement of the UE and the UE moves to an unauthorized area, the UE may suspend the PDU session for a predetermined time without releasing the PDU session (i.e., may maintain the UP (user plane) connection of the PDU session or the context of the PDU session deactivated). Further, when the UE enters the authorized area again within a predetermined time, the network node activates a procedure for resuming the PDU session procedure (i.e., activates the context of the PDU session or UP connection of the PDU session). That is, the fourth disclosure proposes a scheme for suspension/deactivation of the PDU session, unlike the conventional technique of releasing the PDU session. Further, the fourth disclosure proposes a scheme for resuming/activating the suspended/deactivated PDU session.

Figure 9:
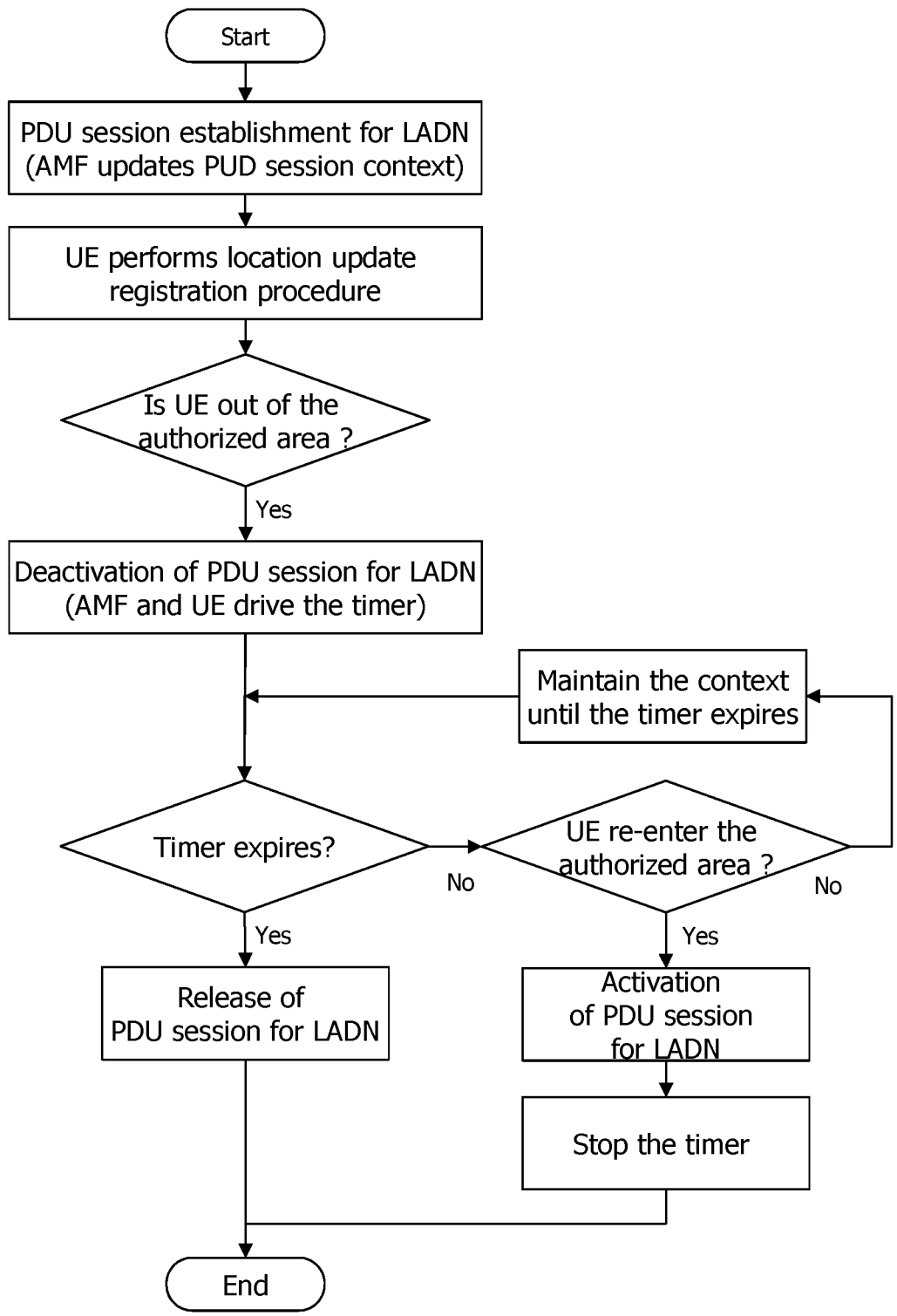
FIG. 9 is a flow chart illustrating a scheme according to a fourth disclosure of the present specification.

FIG. 9 is a flowchart showing a scheme according to the fourth disclosure of the present specification.

1) Upon entering the specific authorized area, the UE creates a PDU session for the LADN. In this connection, according to the present specification disclosure, since the AMF node may detect the location movement of the UE, the AMF node records/updates the marking for the PDU session for LADN into the context such that the session management may be properly performed according to the UE's location movement, or such that the AMF node may notify the SMF node of the UE's location movement. Even if the marking for the PDU session is not recorded in the context, the SMF node may be configured to receive the location movement of the specific UE from the AFM node. Thus, the SMF node may perform the session management.

2) As the location of the UE moves, the UE performs the location update registration procedure (e.g., the TAU procedure). Specifically, the UE may include location information (e.g., TAI, Cell ID, etc.) into a location update registration request message (e.g., TAU request message) and then may transmit the message.

3) The AFM node determines whether the UE continues to use the PDU session based on the location information received from the UE and information on the LADN service area defined in advance, or information on the LADN service area as received from the PCF node.

When the AMF node is changed due to the movement of the UE, a new AMF may perform a procedure of obtaining the context from the previous AMF. In this connection, the previous AMF node may find out that the UE has moved. In addition, the previous AMF node may include LADN related information (e.g., LADN timer value) to be delivered to the UE into the context and may forward the context to the new AMF node.

4) If it is determined that the UE is out of the LADN service area, a procedure for suspending the PDU session for the LADN (i.e., deactivating the UP connection of the PDU session) is performed. Additionally, the LADN timer associated with deactivation of the PDU session is activated. The timer may be driven by the network node and the UE. When the UE recognizes that it has left the LADN service area, the UE may drive the timer by itself; or the UE may receive the value of the timer from the network node and may drive the timer based on the received timer value.

Even when data transmission/reception over the PDU session is not completed and data is still being transmitted in the network, and if the UE leaves the LADN service area, the PDU session may be suspended (i.e., the UP connection of the PDU session may be deactivated). Accordingly, it may be suggested according to the fourth disclosure that, when the PDU session is suspended (i.e., the UP connection of the PDU session is disabled), the data buffering in the network node may be interrupted, or the buffered data may be dropped.

That is, if the AMF recognizes the location movement of the UE and subsequently determines the suspension (or deactivation) of the PDN session for the LADN, the following actions may be performed:

i) The AMF node sends the deactivation information of the PDN session for the LADN to the SMF node. In addition, the AFM node may pass the value of the timer associated with the LADN to the SMF node. The SMF node may then forward the indication associated with buffering to the UPF node. In this connection, the SMF node may forward the timer value to the UPF node. Alternatively, the SMF node may calculate the buffering time by adding or subtracting a guard time to or from the timer value, and may transmit the calculated buffering time to the UPF node. Alternatively, when receiving the indication, the UPF node may determine a buffering time value based on a preset value.

ii) The AMF node sends the deactivation information of the PDN session for the LADN to the SMF node. Furthermore, the AFM node delivers a timer value to the SMF node. The SMF node notifies the UPF node of an indication to instruct the UPF node not to perform buffering (that is, an indication to drop data being buffered, or an indication to drop additional received data if there is the additional received data). In this connection, the SMF node may forward the timer value to the UPF node. Alternatively, the SMF node may calculate the non-buffered time by adding or subtracting the guard time to or from the timer value, and may transmit the calculated non-buffered time to the UPF node. Alternatively, when receiving the indication, the UPF may determine non-buffered time based on a preset value.

5) The UE and the network node maintain suspension/deactivation of the PDU session until the timer expires. That is, even if a procedure for initiating data transmission/reception is started by either the UE or the network node, a rejection message may be transmitted together with appropriate rejection reason information. If the UE does not return to a valid authorized area (i.e., LADN service area) until the timer expires, a procedure for releasing the corresponding PDU session is performed. However, if the UE returns to the valid authorized area (i.e., LADN service area) before the timer expires, a procedure for resuming or activating the corresponding PDU session is performed.

6) The PDU session is resumed or activated at the following times: i) If delay/latency time is important or if there is data being buffered according to policy, the PDU session may be resumed or activated immediately as soon as the UE returns to the valid authorized area (i.e., LADN service area). Even when the UE returns to the valid authorized area (i.e., LADN service area), the PDU session may be resumed or activated at the time when data transmission is required or when data transmission/reception occurs. On the other hand, if the UE returns to the valid authorized area (i.e., LADN service area), regardless of which scheme (i or ii) as described above is used, the timer immediately stops. This is to prevent the corresponding PDU session from being released by expiration of the timer when deactivation of the PDU session is maintained even though the UE returns to the valid authorized area (i.e., LADN service area). In other words, this is because the PDU session must be maintained when the UE returns to the valid authorized area (i.e., LADN service area), and the PDU session management should not be influenced by the timer within the valid authorized area (i.e., LADN service area).

Figure 10:
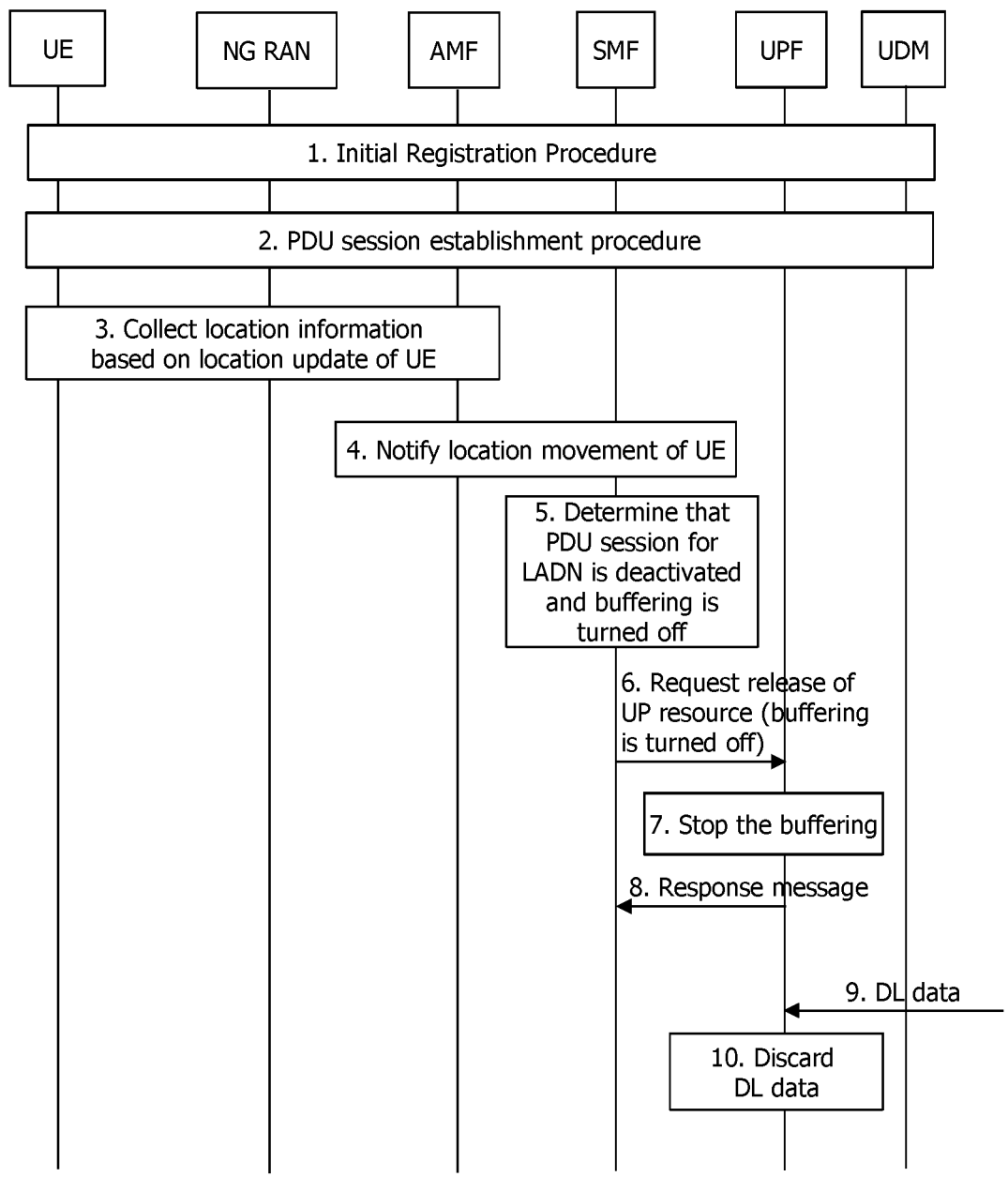
FIG. 10 is a flowchart illustrating an example of disabling a PDU session and turning off buffering according to the fourth disclosure of the present specification.

FIG. 10 is a flowchart illustrating an example of deactivating a PDU session and turning off buffering according to the fourth disclosure of the present specification.

1) Referring to FIG. 10, the UE performs an initial registration procedure to access a 5G network system.

2) The UE performs a PDU session establishment procedure simultaneously with or separately from the above-described 1) process. In order to perform the PDU session establishment procedure together with the above-described 1) process, all PLMNs to be used by the UE must be included in the LAND service area, and corresponding information must be set in advance for the UE. Alternatively, the PDU session establishment procedure may be performed separately from the 1) process, as described above with reference to FIG. 7. That is, when the UE receives a registration accept message including LADN information from the AMF node, the UE may perform the PDU session establishment procedure according to the LADN information.

3) The AFM node may collect location information of the UE when the UE moves and thereby the UE performs a location update registration procedure or when the UE performs a periodic location update registration procedure.

4) The AFM node forwards the location information of the UE (for example, information indicating whether the UE has entered the LADN service area or is out of the area) to the SMF node as needed. The SMF node may be previously registered on the AFM so that the AFM node reports the location information of the UE to the SMF node.

5) If it is determined that the UE is out of the authorized area, i.e. the LADN service area, the SMF node determines how to manage the PDU session for the LADN. In the example of FIG. 10, the corresponding PDU session (UP connection of the PDN session) is determined to be deactivated. This determination may be performed in consideration of the location information of the UE, the policy/configuration of the service provider, and the like. Thus, if it is determined that the PDU session is to be deactivated, it is also determined whether to turn on/off buffering in the UPF node. The determination as to whether to turn on/off the buffering may be performed in parallel each time it is determined that the corresponding PDU session (UP connection of the PDN session) is deactivated. Alternatively, the determination as to whether to turn on/off the buffering may be performed once, and then the result of the determination may be recorded in the configuration information.

The determination as to whether the buffering is turned on/off is basically performed based on the policy/configuration information of the service provider/network, and, further, the determination as to whether the buffering is turned on/off depends additionally on the following factors:

Delay sensitivity: Buffering is meaningless for data with high delay sensitivity, that is, data that should be delivered immediately without delay. Therefore, for the determination as to whether the buffering is turned on/off, it may be considered whether the corresponding LADN service is directed to data with high delay sensitivity. Whether the corresponding LADN service is for data with high delay sensitivity may be confirmed by checking the 5QI of the flow in the PDU session context. For example, if the PDU session for LADN is used for a flow such as 5QI 2, 3, 6, 7, etc. indicating live streaming, a real time game, etc., the SMF node determines to turn off the buffering in the UPF node. In addition, if the PDU session has a specific 5QI number as defined by the service provider rather than a standard 5QI value and there is a configuration to turn off buffering for this number, the SMF node may determine to turn off the buffering in the UPF based on this configuration.

TABLE 2

| 5QI value & QFI | Resource type | Priority level | Packet Delay Budget | Packet Error Rate | Example service |
| --- | --- | --- | --- | --- | --- |
| 1 | GBR | 20 | 100 ms | $10^{-2}$ | Voice call |
| 2 | | 40 | 150 ms | $10^{-3}$ | Video call |
| 3 | | 30 | 50 ms | $10^{-3}$ | Real time game, V2X message |
| 4 | | 50 | 300 ms | $10^{-5}$ | Video |
| 65 | | 7 | 75 ms | $10^{-2}$ | Important PTT(Push To Talk) |
| 66 | | 20 | 100 ms | $10^{-2}$ | Less important PTT |
| 75 | | 25 | 50 ms | $10^{-5}$ | V2X message |
| 5 | Non-GBR | 10 | 100 ms | $10^{-5}$ | IMS signaling |
| 6 | | 60 | 300 ms | $10^{-6}$ | Video buffering and streaming |
| 7 | | 70 | 100 ms | $10^{-3}$ | Voice, video |
| 8 | | 80 | 300 ms | $10^{-6}$ | Video buffering and streaming |
| 9 | | 90 | 300 ms | $10^{-6}$ | Video buffering and streaming |
| 69 | | 5 | 60 ms | $10^{-6}$ | Important signaling with high delay sensitivity |
| 70 | | 55 | 200 ms | $10^{-6}$ | Important data |
| 79 | | 65 | 50 ms | $10^{-2}$ | V2X message |

6) In order to deactivate the PDU session, the SMF node instructs the UPF node to release the UP connection of the PDU session, that is, to release the UP resource. In this connection, the SMF node may instruct to turn off the buffering as determined in the 5) process. That is, the SMF node may instruct drop of data being buffered. Additionally, if whether to turn on/off the buffering is not determined on the entire PDU session basis but on a flow unit basis, the SMF node may forward the flow id/5QI information to the UPF node together.

7) The UPF node releases the UP connection, that is, releases the UP resource according to an instruction from the SMF node. In addition, the buffering configuration is updated according to the instruction to turn the buffering on and off. That is, when the UPF node receives an indication to turn off the buffering, the UPF node drops the data being buffered.

8) The UPF node transmits a response message to the SMF node.

9) On the other hand, when the downlink data for the UE arrives at the UPF node, the UPF node checks whether it is configured such that the buffering for the PDU session/flow of the UE is turned off. If the buffering is configured to be turned off, the UPF node discards the corresponding downlink data without buffering it. Accordingly, the UPF node may not transmit downlink data notification (DDN) to the SMF node. In this connection, the UPF node may record and store the event that the downlink data is discarded according to the configuration of the network.

Figure 11:
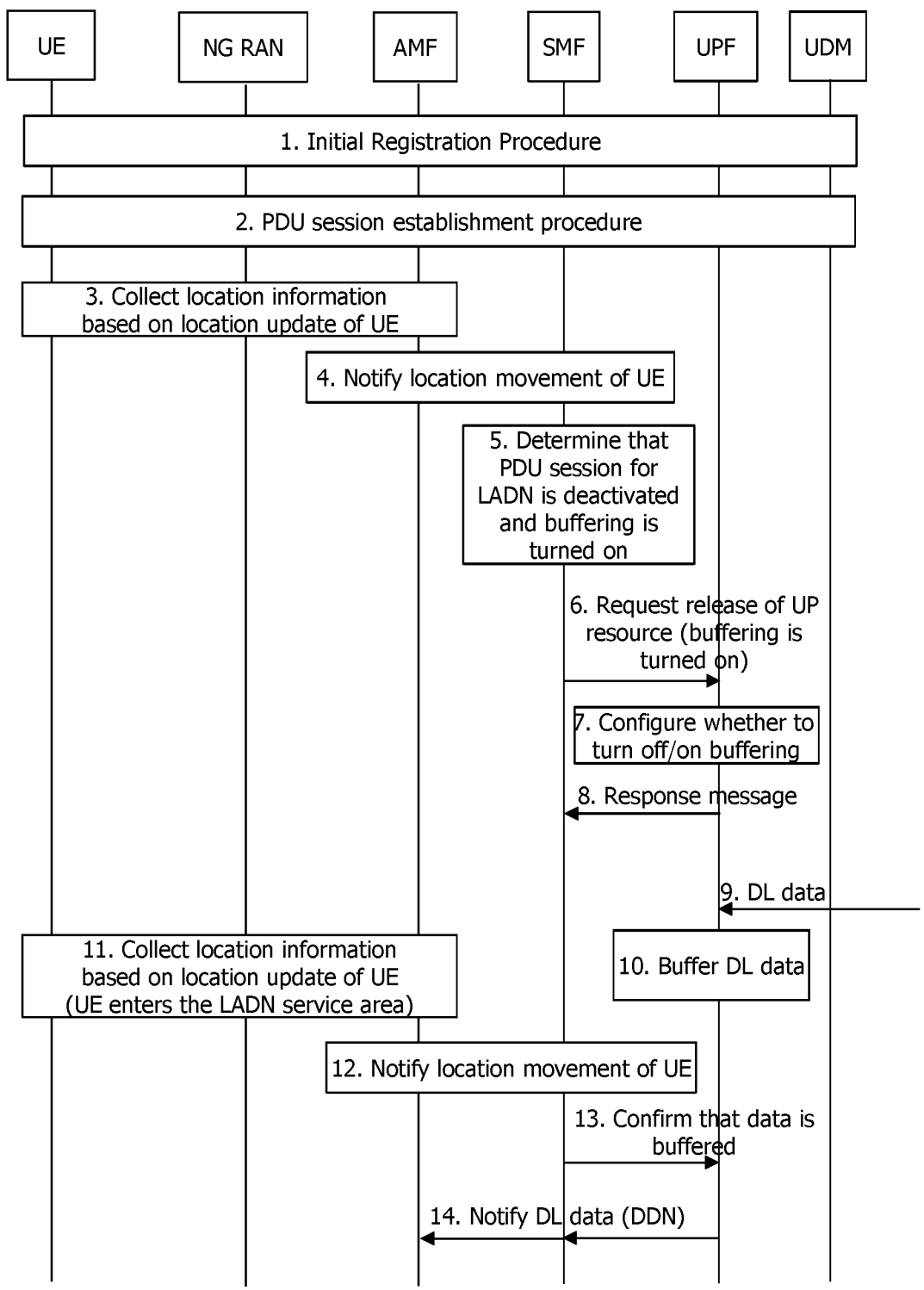
FIG. 11 is a flowchart illustrating an example of disabling a PDU session and turning on buffering and disabling transmission of the DDN according to the fourth disclosure of the present specification.

FIG. 11 is a flowchart illustrating an example of disabling a PDU session and turning on buffering and disabling transmission of the DDN according to the fourth disclosure of the present specification.

1-10) These processes are similar to the processes 1 to 10 of FIG. 10, except that even when the PDU session is deactivated, the SMF node determines to turn on the buffering in the UPF node unlike FIG. 10, and transmits a corresponding indication to the UPF node. In this process 10, since the buffering-on is indicated from the SMF node, the downlink data is buffered.

However, the UPF node may not send the DDN to the SMF node even when buffering the downlink data.

11) When the UE moves and re-enters the authorized area, i.e., the LADN service area, the AFM node finds the entry state.

12) The AFM node delivers the location information of the UE to the SMF node.

13) The SMF node transmits a request signal to the UPF node to know whether there is buffered data in the UPF node. In addition, the SMF node may request the UPF node to buffer future downlink data and to transmit the DDN.

14) If there is buffered data in the UPF node, the UPF node transmits a DDN message to the SMF node. The SMF node then allows the AFM node to send the paging signal to the UE.

Figure 12:
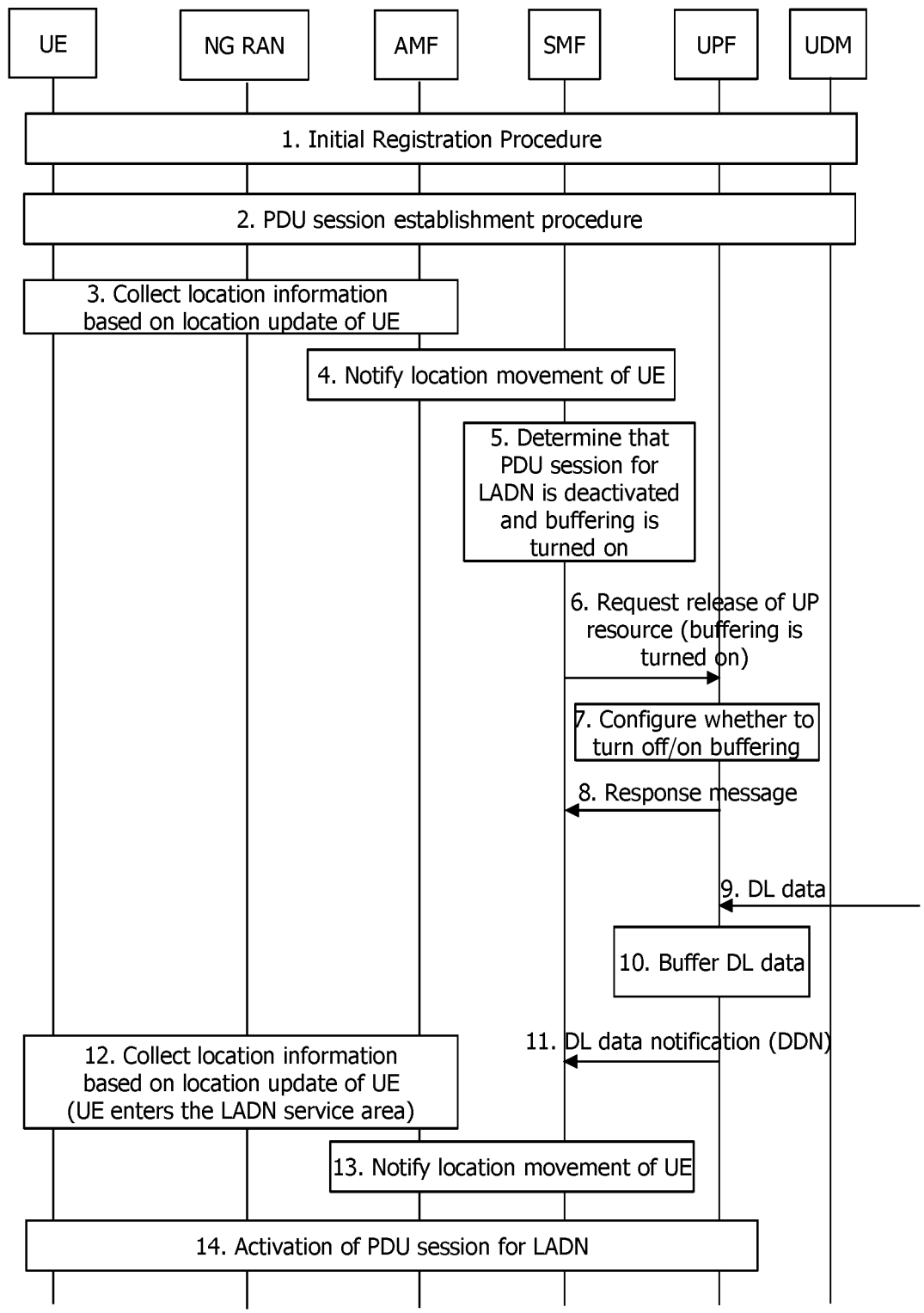
FIG. 12 is a flowchart illustrating an example of disabling a PDU session and turning on buffering and enabling transmission of the DDN according to the fourth disclosure of the present specification.

FIG. 12 is a flowchart illustrating an example of disabling a PDU session and turning on buffering and enabling transmission of the DDN according to the fourth disclosure of the present specification.

1-10) These processes are similar to the processes 1 to 10 of FIG. 10, except that even when the PDU session is deactivated, the SMF node determines to turn on the buffering in the UPF node unlike FIG. 10, and transmits a corresponding indication to the UPF node. In this process 10, since the buffering-on is indicated from the SMF node, the downlink data is buffered.

11) FIG. 12 shows an example in which the UPF node buffers the downlink data and transmits the DDN to the SMF node. When the SMF node receives the DDN, the SMF node confirms the PDN session of the UE. In this connection, the SMF node may recognize that the PDU session of the UE is for the LADN and the session is in the deactivation state at present. In this connection, the SMF node may or may not immediately perform the paging procedure for the corresponding UE. Whether or not to perform such a paging procedure may be determined according to the network configuration. If there is no dependency between the location update area of and the LADN service area for the UE, the network may perform the paging procedure for the corresponding UE. The process 12) below refers to a procedure in the case where the network determines not to immediately perform the paging procedure for the UE. If the SMF node determines not to immediately perform the paging procedure for the UE, the SMF node may record/store the existence of the downlink data.

12) When the UE moves and re-enters the authorized area, i.e., the LADN service area, the AFM node finds the entry state.

13) The AFM node delivers the location information of the UE to the SMF node.

14) The SMF node confirms that downlink data is being buffered based on the DDN received in the process 11). Then, the SMF node performs a procedure for activating the PDN session since the UE has entered the LADN service area. In addition, the SMF node transmits a paging signal to the UE.

The contents described so far may be implemented in hardware. This will be described with reference to the drawings.

Figure 13:
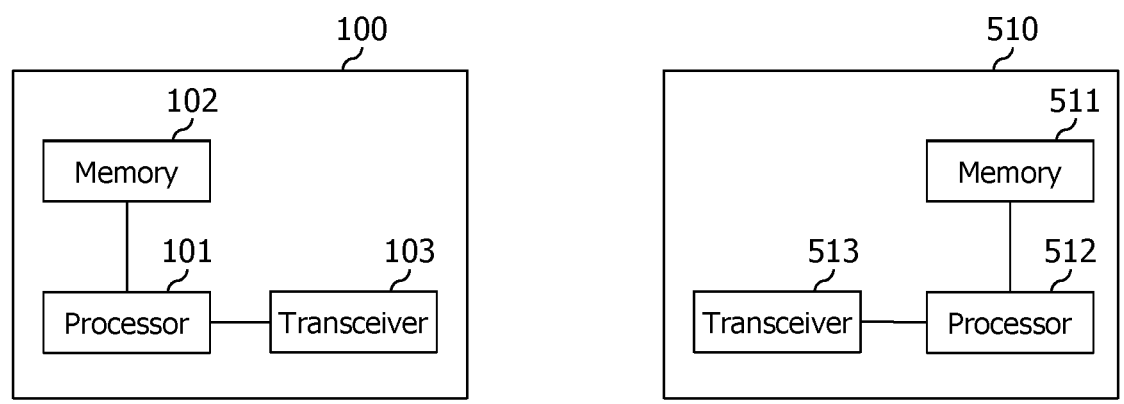
FIG. 13 is a configuration block diagram of a UE and a network node according to an embodiment of the present invention.

FIG. 13 is a configuration block diagram of a UE and a network node according to an embodiment of the present invention.

As shown in FIG. 13, the UE 100 includes a storage 101, a controller 102, and a transmitting and receiving module 103. In addition, the network node may be an access network (AN), a radio access network (RAN), an AMF node, a CP function node, or an SMF node. The network node includes a storage 511, a controller 512, and a transmitting and receiving module 513.

The storages may store therein modules configured to perform the above-described method.

The controllers may control the storages and the transmitting and receiving modules to perform the above-described method. Specifically, the controllers each execute modules configured to perform the methods, as stored in the storages. The controllers transmit the aforementioned signals through the transmitting and receiving modules.

While the present invention has been particularly shown and described with reference to the exemplary embodiments thereof, it is to be understood that the invention is not limited to the disclosed exemplary embodiments. Thus, the present invention may be modified, changed, or improved in various forms within the scope of the present invention and the scope of the claims.

What is claimed is:

1. A method for managing session, the method performed by a session management function (SMF) node and comprising:
performing procedure for establishing a data session of a user equipment (UE),
wherein the data session of the UE is established over the UE, an access and mobility management function (AMF) node, the SMF node and an user plane function (UPF) node;
receiving, information related to a location change of the UE from the AMF node, wherein the location change of the UE is related to that the UE moved out of a local area data network (LADN) service area; and transmitting information enabling the UPF node to discard data related to the data session of the UE to the UPF node, based on (i) that the UE moved out of the LADN service area and (ii) the data session of the US is related to the LADN, wherein a context for the data session is maintained in the SMF node, based on that the information enabling the UPF node to discard the data related the to the data session of the UE is transmitted.

2. The method of claim 1, wherein the information enabling the UPF node to discard the data related to the data session of the UE includes a notification to deactivate a connection related to the data session of the UE while maintaining the established data session of the UE.

3. The method of claim 1, wherein the information enabling the UPF node to discard the data related to the data session of the UE includes information not to buffer the data related to the data session of the UE.

4. The method of claim 1, wherein the discarding the data comprises:
discarding the data based on a timer based on that the UE moved out of the LADN service area.

5. The method of claim 1, further comprising:
receiving a service request for an another data session while the UE is outside of the LADN service area; and
transmitting a reject message for the second data session.

6. A session management function (SMF) node for managing a session, comprising:
at least one transceiver;
at least one processor; and
at least one computer memory operably connected to the at least one processor and storing instructions that, based on being executed by the at least one processor, perform operations comprising:
performing procedure for establishing a data session of a user equipment (UE),
wherein the data session of the UE is established over the UE, an access and mobility management function (AMF) node, the SMF node and an user plane function (UPF) node;
receiving, via the at least one transceiver, information related to a location change of the UE from the AMF node,
wherein the location change of the UE is related to that the UE moved out of a local area data network (LADN) service area; and
transmitting, via the at least one transceiver, information enabling the UPF node to discard data related to the data session of the UE to the UPF node, based on (i) that the UE moved out of the LADN service area and (ii) the data session of the US is related to the LADN,
wherein a context for the data session is maintained in the SMF node, based on that the information enabling the UPF node to discard the data related the to the data session of the UE is transmitted.

7. The SMF node of claim 6, wherein the information enabling the UPF node to discard the data related to the data session of the UE includes a notification to deactivate a connection related to the data session of the UE while maintaining the established data session of the UE.

8. The SMF node of claim 6, wherein the information enabling the UPF node to discard the data related to the data session of the UE includes information not to buffer the data related to the data session of the UE.

9. The SMF node of claim 6, wherein the discarding the data comprises:
discarding the data based on a timer based on that the UE moved out of the LADN service area.

10. The SMF node of claim 6, wherein the processor is further configured to:
receiving, via the at least one transceiver, a service request for an another data session while the UE is outside of the LADN service area; and
transmitting, via the at least one transceiver, a reject message for the second data session.

* * * * *